Feb. 15, 1949.   H. J. COOK   2,461,524
NUT PEELER
Filed July 25, 1945
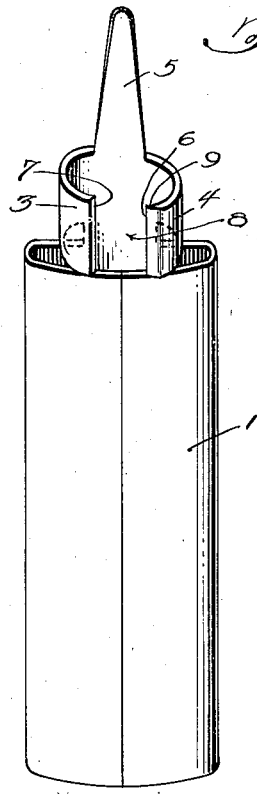
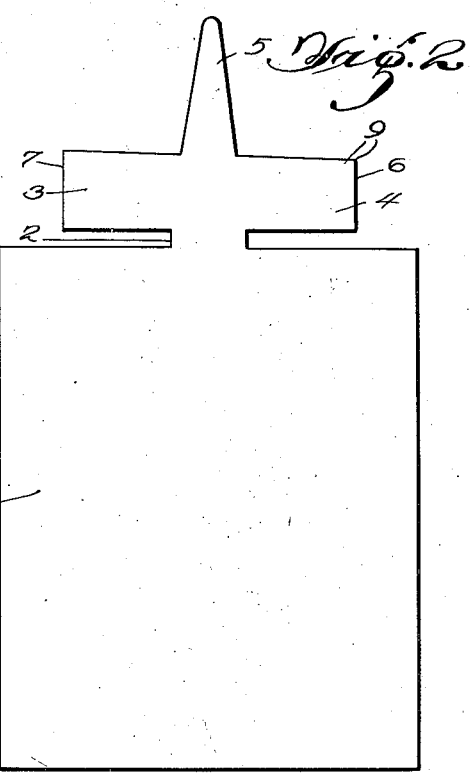
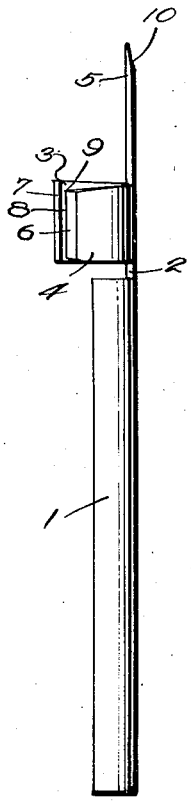
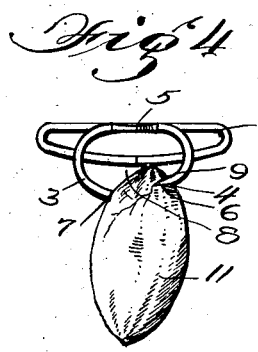
INVENTOR.
Harold J. Cook
BY
William F. Almond
ATTORNEY Patented Feb. 15, 1949

2,461,524

UNITED STATES PATENT OFFICE 2,461,524

NUT PEELER

Harold J. Cook, United States Army, New Orleans, La.

Application July 25, 1945, Serial No. 607,077

5 Claims. (Cl. 146—13)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a device for removing the shells from nuts, and more particularly to an implement whereby the shells may be removed from nuts without crushing or breaking the kernels thereof.

The shelling of nuts, as practiced heretofore, has involved the use of a degree of labor out of all proportions to the value of the product obtained. To obtain the greatest proportion of whole nut meats, it has been necessary to employ the laborious methods of hand-shelling which are tedious and time consuming. Machinery has been developed by which large quantities of nuts may be rapidly deprived of their shells, but these possess the disadvantage that the nut meats are invariably crushed and broken in the process resulting in a product of poor quality.

It is an object of this invention to provide an implement termed a "nut peeler," by means of which the shells of nuts can be rapidly and easily removed by hand with a minimum expenditure of labor.

A further object of the invention is the provision of an implement of the kind described which is capable of removing the shells from nuts by breaking and prying the same from the kernels thereof in such a manner as to leave the nut meats in a whole and undamaged condition.

By the use of this invention, the shells can be effectively removed from such nuts as pecans, for example, without breaking, crushing or otherwise damaging the kernels, thus assuring a product of the highest market value.

The invention comprises an implement formed preferably of one piece of metal and having opposed jaw-like portions for operating upon the shell of a nut to break the same into small pieces and separate them from the kernel or meat of the nut.

The invention will be best understood from the following detailed description of the same constituting a specification thereof, together with the accompanying drawings wherein:

Fig. 1 is a perspective view of the completed implement;

Fig. 2 is a plan view of a stamping from a piece of metal before the same is folded or bent into the condition to form the completed implement;

Fig. 3 is a side elevational view of the completed implement; and

Fig. 4 is a top end view of Fig. 3 showing the arrangement of the jaws of the implement and illustrating a manner in which the same operate upon the shell of a nut.

As shown in the drawings the implement is preferably formed of one piece of metal by a stamping operation and may have initially the shape shown in Figure 2. 1 is the body or handle portion of the implement, formed in this instance by folding the longitudinal edges of the metal stamping of Fig. 2 inwardly toward the center presenting a hollow tubular handle, as best seen in Figs. 1 and 4.

At one end the body or handle portion 1 is provided with a neck 2 above which are located the oppositely extended portions 3 and 4 which are adapted to be bent into curved jaw-like formations having the opposed end edges 6 and 7 spaced apart as indicated at 8. A flat blade-like extension 5 surmounts the jaw portions 3 and 4, which extension may be beveled or sharpened as indicated at 10 for a purpose later to be explained.

The jaw portion 4 is preferably formed with its edge 6 of shorter extent than the edge 7 of the opposed jaw portion 3, and this edge 6 is beveled or sharpened into a knife edge, as plainly seen in Figs. 1, 3, and 4. The beveling and sharpening of the edge 6 provides the same at its upper extremity with a sharp point 9 for a purpose later to be pointed out.

The edge portion 7 of the jaw-like formation 3 is preferably flat or squared.

As best seen in Fig. 4 the jaw-like portion 4 is bent on a somewhat shorter radius than is the opposed portion 3, so that the edge 6 lies inwardly of the edge 7.

In the operation of the above-described implement, the body or handle portion 1 is grasped in either hand, and a nut 11, whose shell has preferably been previously cracked, is inserted with the other hand into the space 8 between the jaw-like portions 3 and 4, as seen in Fig. 4. By pressing the nut firmly into the space 8 and slightly rotating the implement about the edge 7 of the portion 3 as a fulcrum, the beveled or sharpened edge 6 is brought into engagement with a crack in the shell of the nut and exerts a prying action on that portion of the shell which lies between the edges 6 and 7.

By constantly turning the nut while pressing the same into the space 8 and slightly rotating the implement in the manner described above, portions of the shell are successively broken off and separated, until the kernel or nut meat is thus completely deprived of its shell.

It will be seen that as the implement is operated, the edge 7 is constantly shifted to bear on some portion of the shell surface which is as yet unbroken, while the sharpened edge 6 successively engages broken edges of the shell to exert an outward prying action thereon. Thus, in the efficient use of the implement the shell alone receives the breaking force and the kernel of the nut is never subjected to a force sufficient to break or damage the same, and can be removed in a whole condition from the shell.

With nuts having relatively soft shells, such, for example, as certain kinds of pecans or almonds, the pressing of the nut into the space 8 of the implement will alone be sufficient to crack the shell so that the edge 6 can enter the same and exert its prying action thereon. In the case of nuts with relatively hard shells, however, it first may be necessary to crack the shells slightly to form edges thereon which the edge 6 may contact. It will be noted in this connection that the point 9 of the sharpened edge 6 is capable of entering a very minute crack, so that the initial cracking of the shell, when necessary, need be only very slight, and thus the shell need not be subjected to a force sufficient to crush the kernel of the nut.

It will also be apparent that the location of the sharpened edge 6 and the point 9 thereof respectively inwardly of and below the top extremity of the edge 7, as best seen in Fig. 4 of the drawings not only provides protection for the sharpened portions of the implement, but assures a measure of safety to the operator.

When the nut meat or kernel has been removed from the shell in the manner pointed out above, the blade-like extension 5 may be used to remove portions of inner shell or other material still clinging thereto, such, for example, as the material found in the recesses of the kernels of pecans.

It will be thus seen that the invention provides a safe and inexpensive implement of simple design and rugged construction with which the shells of nuts can be rapidly and efficiently removed and the kernels or nut meats thereof retained in their most attractive and marketable condition.

Having thus clearly shown and described the invention, what is claimed and desired to secure by Letters Patent is:

1. An implement for removing the shells from nuts, comprising a handle and a pair of opposed arcuate jaws mounted thereon in fixed spaced-apart relationship, one of said jaws having a sharpened elongated shell-prying edge provided with a shell-penetrating point, the other of said jaws being curved on an arc of a longer radius than the first-mentioned jaw and having an elongated blunt bearing edge adapted to bear on the shell of the nut and projecting beyond the sharpened shell-prying edge of the first-mentioned jaw.

2. An implement for removing the shells from nuts, comprising a handle and a pair of opposed jaws mounted thereon in fixed spaced-apart relationship, one of said jaws having a sharpened elongated shell-prying edge provided with a shell-penetrating point, the other of said jaws having a blunt elongated bearing edge adapted to bear on the shell of the nut and projecting beyond the sharpened shell-prying edge of the first-mentioned jaw.

3. An implement for removing the shells from nuts, comprising a handle and a pair of opposed jaws mounted thereon in fixed spaced-apart relationship, one of said jaws having a sharpened elongated shell-prying edge, the other of said jaws having an elongated bearing edge projecting beyond the sharpened shell-prying edge of the first-mentioned jaw.

4. An implement for removing the shells from nuts, comprising a single handle and a pair of opposed jaws integral therewith and arranged in spaced-apart relationship, one of said jaws having a sharpened elongated shell-prying edge, the other of said jaws having a blunt elongated bearing edge projecting beyond the sharpened shell-prying edge of the first-mentioned jaw.

5. An implement for removing the shells from nuts, comprising an elongated handle and a pair of laterally-arranged and opposed arcuate jaws mounted thereon in fixed spaced-apart relationship, one of said jaws having an elongated sharpened shell-prying edge, the other of said jaws being curved on an arc of a longer radius than the first-mentioned jaw and having an elongated blunt bearing edge adapted to bear on the shell of the nut and projecting beyond the sharpened shell-prying edge of the first-mentioned jaw.

HAROLD J. COOK.

REFERENCES CITED

The following references are of record in the file of this patent:

UNITED STATES PATENTS

| Number | Name | Date |
| --- | --- | --- |
| 94,794 | Walker | Sept. 14, 1869 |
| 304,320 | Hibberd | Sept. 2, 1884 |
| 680,263 | Maddux | Aug. 13, 1901 |
| 1,720,575 | Smith | July 9, 1929 |
| 1,732,676 | Erbele | Oct. 22, 1929 |
| 2,090,341 | Burnham | Aug. 17, 1937 |
| 2,201,911 | Mizera | May 21, 1940 |